(12) United States Patent
Sturt et al.

(10) Patent No.: US 7,188,881 B1
(45) Date of Patent: Mar. 13, 2007

(54) SLIDING LOAD FLOOR SYSTEM WITH LEVITATION MECHANISM

(75) Inventors: Alan Sturt, West Bloomfield, MI (US); Artur W. Dlugosz, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/162,239

(22) Filed: Sep. 2, 2005

(51) Int. Cl.
B60P 3/34 (2006.01)
(52) U.S. Cl. .................................. 296/26.1; 296/26.09
(58) Field of Classification Search ............... 296/26.1, 296/26.14
See application file for complete search history.

(56) References Cited

U.S. PATENT DOCUMENTS

| | | | | |
|---|---|---|---|---|
| 2,284,419 A * | 5/1942 | Greig | ...................... | 296/26.09 |
| 4,023,850 A | 5/1977 | Tillery | | |
| 4,305,695 A * | 12/1981 | Zachrich | ...................... | 414/522 |
| 4,531,773 A | 7/1985 | Smith | | |
| 4,681,371 A * | 7/1987 | Leonard | ...................... | 296/26.1 |
| 4,752,095 A * | 6/1988 | Brady | ...................... | 296/37.6 |
| 5,046,913 A * | 9/1991 | Domek et al. | ............... | 414/522 |
| 5,352,083 A * | 10/1994 | Roberts et al. | ............. | 414/477 |
| 5,423,650 A * | 6/1995 | Zerbst et al. | ................ | 414/462 |
| 5,454,684 A * | 10/1995 | Berens | ...................... | 296/26.1 |
| 5,513,941 A * | 5/1996 | Kulas et al. | ............. | 296/26.09 |
| 5,755,480 A | 5/1998 | Bryan | | |
| 5,765,987 A * | 6/1998 | Zimmermann | ............... | 414/800 |
| 5,829,945 A * | 11/1998 | Stanley | ...................... | 296/26.09 |
| 5,934,725 A * | 8/1999 | Bowers | ...................... | 296/26.09 |
| 6,065,792 A * | 5/2000 | Sciullo et al. | ............ | 296/26.09 |
| 6,273,487 B1 * | 8/2001 | Schurig et al. | ........... | 296/37.14 |
| 6,338,518 B1 | 1/2002 | D Annunzio et al. | | |
| 6,516,983 B2 * | 2/2003 | Sotiroff et al. | ............... | 224/281 |
| 6,659,524 B1 * | 12/2003 | Carlson | ...................... | 296/26.09 |
| 6,695,380 B1 * | 2/2004 | Hicks | ...................... | 296/97.23 |
| 6,779,824 B1 * | 8/2004 | Lazarevich et al. | ........ | 296/37.6 |
| 6,860,536 B1 * | 3/2005 | Schimunek | ............... | 296/26.09 |
| 7,111,887 B2 * | 9/2006 | Cooley | ...................... | 296/26.09 |
| 2006/0145501 A1 * | 7/2006 | Warner et al. | ............. | 296/37.3 |

* cited by examiner

Primary Examiner—Kiran B. Patel
(74) Attorney, Agent, or Firm—Brooks Kushman P.C.

(57) ABSTRACT

A sliding load floor system for use in the rear cargo area of a vehicle. The cargo area has a pair of opposing side portions that extend longitudinally in relation to the center line of the vehicle. A pair of opposing transverse portions extend laterally in relation to the vehicle. A storage area is positioned between and at a level below a plane including the side and transverse portions. The sliding load floor system comprises a slide mechanism including a pair of opposing rail members having a forward edge, and a removable load floor that is detachably positioned in relation to the slide mechanism; and a hinge assembly that is mounted to the side portions. The forward edges of the rail members are connected to the hinge assembly so that the slide mechanism, and the removable load floor may be moved arcuately in relation to the hinge assembly, and the load floor slid rearwardly. Also included is a levitation mechanism for raising a rear edge of the sliding load floor so that the load floor may be extended rearwardly outside the vehicle across a raised sill in the cargo area.

11 Claims, 2 Drawing Sheets

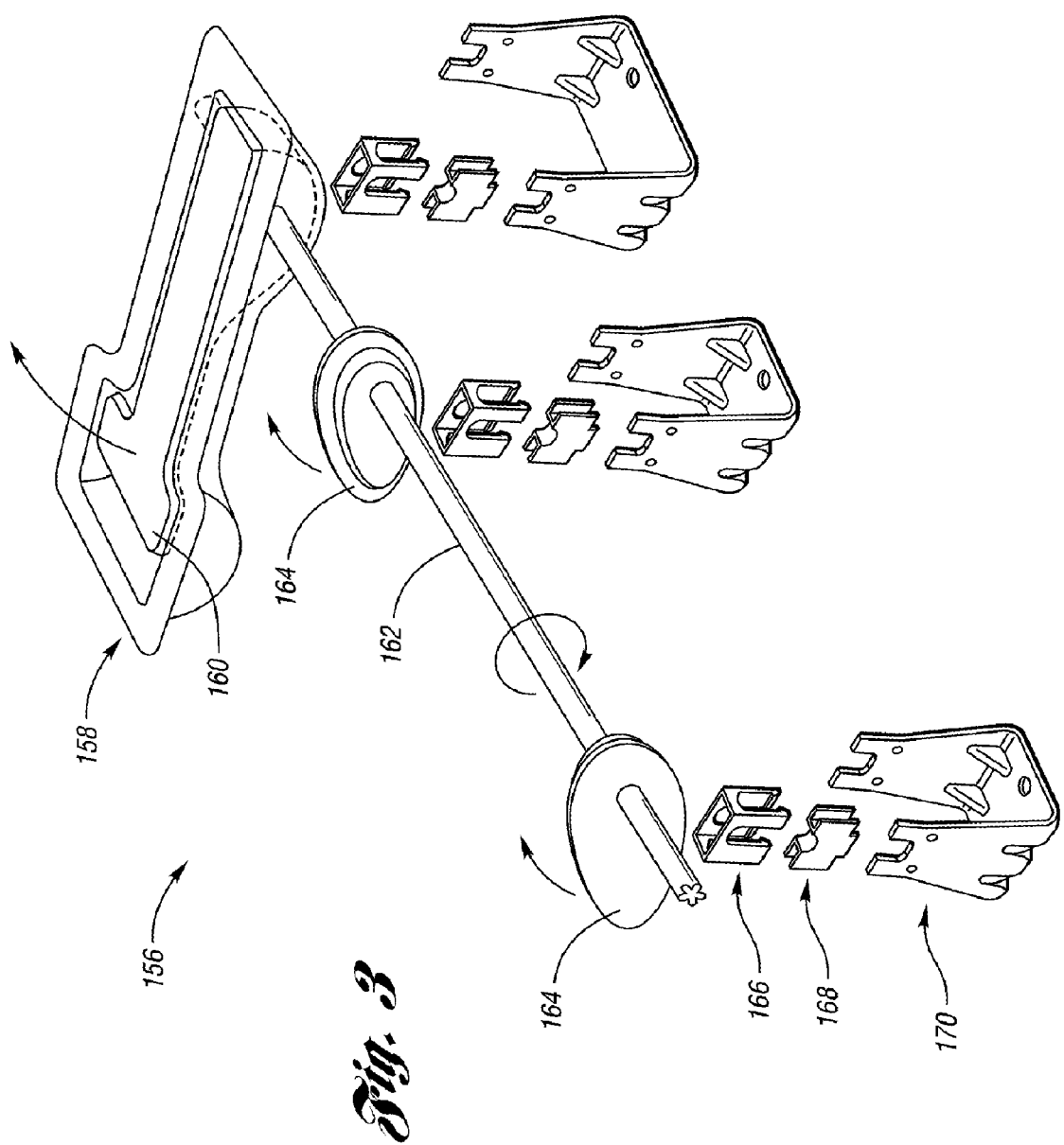

SLIDING LOAD FLOOR SYSTEM WITH LEVITATION MECHANISM

BACKGROUND OF THE INVENTION

1. Field of the Invention

The invention relates to a sliding load floor system for the cargo area of a vehicle to allow ergonomic loading and unloading of heavy cargo.

2. Background Art

Today's roads are traveled by full-size pickup trucks, mid-size, and compact vehicles. Typically, they have relatively short rear cargo areas. Abbreviated length restricts the ability of the vehicle operator who wishes to ergonomically transport longer or heavier items that would otherwise be accommodated by vehicles having a longer bed. Tailgate extension devices offer an extended bed floor area. See, e.g., U.S. Pat. Nos. 4,023,850; 4,531,773; and 5,755,480.

To access the rear cargo area, one must first, for example, raise a tailgate or open the rear doors. To retrieve a heavy package located forwardly in the rear cargo area, one must reach over the rear fascia (or rear bumper) area of the vehicle. This may be inconvenient for cleanliness reasons (e.g., the soiling of clothes from a dirty outside vehicle surface). Further, the act of reaching over to retrieve a heavy object may result in back and other physical injury. Similar considerations apply to the act of placing a heavy load into the cargo area from outside the vehicle. Clearly, it would be desirable to avoid the inconvenience of dirtying one's clothing while reducing the chance of back injury.

SUMMARY OF THE INVENTION

It would be desirable to provide a sliding load floor system that permits heavy cargo items to be loaded and unloaded ergonomically.

It would also be desirable that the sliding load floor be operable generally on a horizontal or near-horizontal plane over a raised sill at the rear of the vehicle.

Relatedly, it would be desirable for the sliding load floor system to lie flush with the cargo floor bed when the sliding load floor is in a retracted (park) position, which may be below the height of the sill.

Conventionally, the rear cargo area of a vehicle includes a pair of opposing side portions or trim panels that extend longitudinally in relation to the length of the vehicle, a pair of opposing transverse portions that extend laterally, and can include a storage bin positioned between and at a level below the plane of the side and transverse portions.

The sliding load floor system disclosed herein includes a slide mechanism. The slide mechanism includes a pair of opposing rail members. Each rail member has a forward edge and a rearward edge. A frame is slidably received by the slide mechanism.

Detachably attached to the frame is a removable load floor. A single-axis hinge assembly is mounted to the side portion of the rear cargo area. The forward edges of the rail members are connected to the hinge assembly. The forward edges of the rail members pivot about the hinge assembly so that the inclination of the load floor can be altered. When inclined sufficiently, access to the storage bin is permitted. When inclined at a shallow angle, its plane extends from the hinge assembly across the raised sill.

Among the art considered in preparing this patent application are commonly owned U.S. Pat. No. 6,338,518; and WO 0153131 that issued to Mink & Associates Inc.

BRIEF DESCRIPTION OF THE DRAWINGS

FIG. 3 is an exploded view of a levitation mechanism for raising the load floor from a parked to the first elevated position.

DETAILED DESCRIPTION OF THE PREFERRED EMBODIMENT(S)

One purpose of this invention is to provide a sliding load floor system in the cargo area of a vehicle that permits heavy cargo items to be loaded and unloaded ergonomically, even over a raised sill at the rear of the vehicle.

Figure 1:
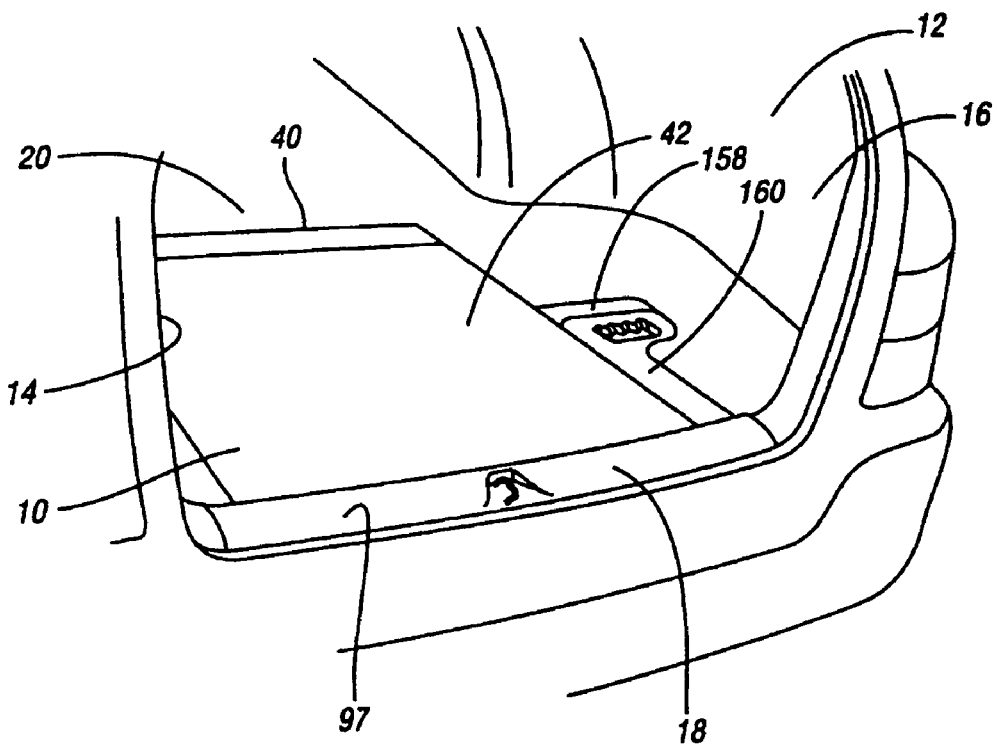
FIG. 1 is a quartering perspective view of a sliding load floor system according to the present invention in a recessed or parked position within the rear cargo area of a vehicle.

In FIG. 1, the rear cargo area 12 includes a pair of opposing side portions or quarter trim panels 14, 16 that extend longitudinally in relation to the length of the vehicle, a pair of opposing transverse portions 18, 20 that extend laterally, and a storage bin 22 (FIG. 2) positioned between and at a level below the plane of the side and transverse portions.

The sliding load floor system 10 disclosed herein includes a slide mechanism 24 (FIG. 2), or other linear bearing or linear motion system. The slide mechanism 24 has a pair of opposing rail members coincident with the floor 42. Each rail member has a forward edge 30 and a rearward edge 34. Optionally, a frame (not shown) is slidably received by the slide mechanism. Preferably, the frame can be removed, if desired, to allow unfettered access to any underlying storage area, so that the storage bin 22 can itself serve as a cargo area. In one embodiment, the slide mechanism 24 includes aluminum extruded rail with cast metal attachment block having nylon liners. Alternatively, the rail members 26, 28 may be formed from rolled steel with steel ball bearings, or equivalent structures. One source for suitable such systems is the Igus Company.

Detachably attached to the frame or to the slide mechanism 24 is a removable load floor 42. Optionally, a mounting bracket may be provided. The mounting bracket (not shown) allows a fully assembled sliding load floor system to be mounted in the vehicle. A hinge assembly 44 is mounted to the side portions of the rear cargo area. The forward edges 30 of the slide mechanism 24 are connected at a pivot 82 to the hinge assemblies. In one embodiment, the connection is provided by a pin or bolt, for example, that hingedly connects a forward edge 30 at the pivot 82 of an associated hinge assembly 44 (left hand side shown only).

Thus, the sliding load floor 42 may be pivoted about the pivot 82 from a reclined (parked) position 92, upwardly to a first elevated position 94 (preferably about 3–10 degrees) to a second elevated or opened position 154.

From the first elevated position 94, the load floor can be deployed rearwardly toward the back of the vehicle across the sill 97 at the rear end of the cargo bed. Such movement generally occurs in a plane that is inclined to a horizontal plane. To accomplish this result, the slide mechanism 24, and the removable load floor 42 are swung upwardly about the forward edges 30. Then the load floor can be slid rearwardly.

Preferably, the load floor or panel 42 is a reversible, blow molded panel that is removably retained within the frame. In one embodiment, the floor has a carpeted surface 56 on one side for a continuous floor appearance and a molded floor surface 58 on the other side to serve as a washable surface, and to provide some support for cargo.

Figure 2:
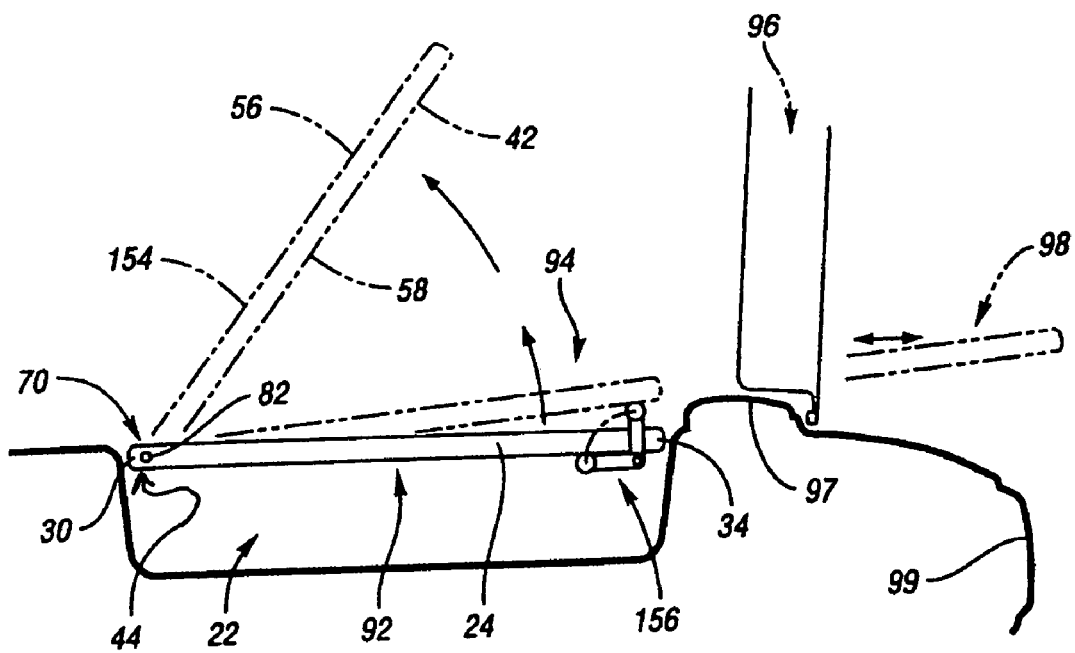
FIG. 2 is a schematic side view of the sliding load floor system illustrating the load floor in its parked position, in a first elevated position, and in a second elevated position.

FIG. 2 is a side view of the disclosed sliding load floor system 10. In order to clear a rear sill 97, the hinge assembly 44 and the forward end of the load floor rotates upwardly and (preferably) locks in position when the load floor 42 is extended. The rear end 34 of each slide mechanism outer component rests upon part of the levitation system 156 or a support associated therewith, thus allowing free movement of the load floor 42 in a slightly inclined plane (in a range of between about 3 and 10 degrees).

FIG. 3 discloses additional detail of a levitation system 156 (see also, FIG. 2) that effectively raises the load floor 42 from a parked position to a slightly inclined position from which it can be extended over the sill 97 to an extended position 98.

The levitation mechanism 156 is located at the rear end of the load floor 42. The mechanism 156 includes two cams 164, one for each side rail. A handle 160 is received in a bezel 158. At one end of the handle, there is a rod or a tube 162 that connects the cams 164.

Rotating the handle 160 by an arcuate displacement of about 100 degrees lifts the rear of the load floor 42 to raise it above the rear sill 97. Then, the load floor 42 can be extended and retracted. The handle 160 can then be returned to the parked position (depicted in FIG. 1), where it is flush with the floor of the cargo bed.

It will be appreciated that the levitation mechanism 156 is illustrated in a preferred embodiment as including a handle 160. Alternatively, the cams 164 could be displaced by other means, such as a motor which becomes energized when a suitably mounted switch that closes an electrical circuit.

As depicted in FIG. 3, the rod or tube 162 is supported at multiple locations, such as at its ends, and if desired at one or more intermediary positions. At any supporting position, there is provided a retainer 166, a bearing block 168, and a support bracket 170, preferably mounted at a level below the floor of the cargo bed.

Preferably, each cam 164 is positioned below a slide mechanism 24 to which the load floor 42 is attached. As each cam 164 is in contact with a fixed or body-mounted component of the slide mechanism 24, the load floor 42 is free to slide to and from the extended position with a moving component of the slide mechanism, even when the floor supports a load force exerted by heavy cargo.

In one embodiment, each cam 164 is equipped with a flange or flanges for alignment of the slide mechanism and to maintain the correct position under the slide.

In some embodiments, the profile of the cam 164 is so configured as to reduce the initial handle effort. One result is that upon lifting the floor (which may or may not bear a load), the effort required is relatively constant throughout the range of handle motion. Thus, the cam 164 can be shaped as a ellipse, an oval, an ovoid, an ovate (or egg-shaped) body or a combination thereof. Alternatively, the cam 164 could be shaped as a lever or an arm that projects from the rod 162.

In an alternate embodiment, the cam 164 may be shaped as a cylindrical roller. In such an embodiment, the rod 162 is keyed eccentrically through the roller along a line parallel to the roller's axis of symmetry.

This invention thus provides a method for sliding heavy cargo items in and out of a vehicle, while providing a relatively lightweight removable panel that can be moved to a different location. If desired, the load floor system may be completely removed so as to make the entire sub-floor of the rear cargo area the storage base.

One advantage of the disclosed system is it provides easy access to sub-floor storage areas while presenting a flush appearance when in the closed position.

Preferably, the disclosed system so configured as to eliminate buzz, squeal, and rattling concerns ("BSR" concerns). In use, the sliding floor may support a load of up to about 440 lbs. (200 kg) when in the fully retracted and extended positions. Maximum deflection is less than about 20 mm, and there is no permanent deformation following repeated use. The effort to fully extend and retract the sliding load floor is less than about 10 kgf when loaded with 440 lbs. (200 kg). In one embodiment, the entire sliding floor load system weighs less than 9500 grams—including the load floor, the sub-floor storage unit, frame, slide mechanism, and tie down rails.

Thus, the disclosed invention provides a means of allowing a sliding load floor to operate over a high rear sill by deploying a cam system for raising the load floor. This approach allows a load floor to be mounted at a low elevation, thereby maximizing interior storage volume. The levitation mechanism is used in combination with a sliding load floor that may be moved to an extended position for loading cargo, even when the rear sill is quite high. In some circumstances, the provision of extra elevation of the load floor in the extended position means that the bearer of a heavy object need not bend so low in order to load the object onto the extended load floor.

Another sliding load floor system is disclosed in U.S. patent application Ser. No. 11/162,237 dated Sep. 2, 2005, entitled "SLIDING LOAD FLOOR SYSTEM WITH TWO-AXIS PIVOTING HINGE" which is filed on the same day as the present application. Another application entitled "SLIDING LOAD FLOOR SYSTEM" disclosing a load floor system was also filed on the date of filing the present application. Its serial number is Ser. No. 11/162,236. Each of these two applications is included herein by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sliding load floor system for use in a rear cargo area of a vehicle, the cargo area having a pair of opposing side portions that extend longitudinally in relation to a center line of the vehicle, and a transverse portion that extends laterally in relation to the vehicle, the sliding load floor system comprising:

a slide mechanism having a forward edge;

a removable load floor that is detachably and slidably positioned in relation to the slide mechanism; and a hinge assembly having a pivot axis, the hinge assembly being mounted in relation to the side portions of the cargo area, the forward edges of the slide mechanism being connected to the pivot axis of the hinge assembly so that the slide mechanism and the removable load floor may be moved arcuately about the pivot axis of the hinge assembly, and the load floor slid rearwardly in relation to the pivot axis; and a levitation mechanism that is mounted at the rear of the cargo area below the load floor.

2. The sliding load floor system of claim 1 wherein the pivot axis permits the slide mechanism to move arcuately, thereby altering the inclination of the removable load floor so that the load floor may be opened to permit access to an underlying storage bin or opened sufficiently to allow the load floor to rest upon the levitation system at the rear of the cargo area when the load floor is at least partially extended.

3. The sliding load floor system of claim 2 wherein the levitation mechanism includes a handle that lies flush with a floor of the rear cargo area when the load floor is in a reclined position.

4. The sliding load floor system of claim 3 further including a bezel that is received within the floor of the rear cargo area, into which the handle is received.

5. The sliding load floor system of claim 4 further including a rod that is keyed to the handle so that when the handle is elevated, the rod rotates therewith.

6. The sliding load floor system of claim 5 further including a pair of cams, each member of the pair underlying a rail in the slide mechanism, the pair of cams being keyed to the rod so that as the rod rotates, the pair of cams rotates therewith, thereby elevating the overlying load floor.

7. The sliding load floor system of claim 6 wherein at least one of the pair of cams has an outside perimeter with a shape selected from the group consisting of an oval, an ellipse, an ovoid, an oblate body, an egg-shaped body, a lever, and combinations thereof.

8. The sliding load floor system of claim 6 wherein the pair of cams comprise a roller having a cylindrical cross section with a longitudinal axis of symmetry passing therethrough, the rod being keyed to the roller so that the rod is positioned eccentrically in relation to the axis of symmetry.

9. The sliding load floor system of claim 7 wherein at least one of the pair of cams is mounted eccentrically upon the rod.

10. The sliding load floor system of claim 8 wherein the levitation mechanism includes a retainer that receives the rod, a bearing block that receives the retainer, and a support bracket that receives the bearing block, the support bracket being secured to a lower portion of the rear cargo area of the vehicle.

11. The sliding load floor of claim 2 wherein the levitation mechanism comprises a motor in an electrical circuit which becomes energized by a suitably mounted switch closes the electrical circuit, the motor serving to turn a rod to which a pair of cams is keyed.

* * * * *